May 2, 1961 B. HAYDEN 2,982,314
ADJUSTABLE HOOK FOR HARNESS FRAME
Filed May 8, 1959
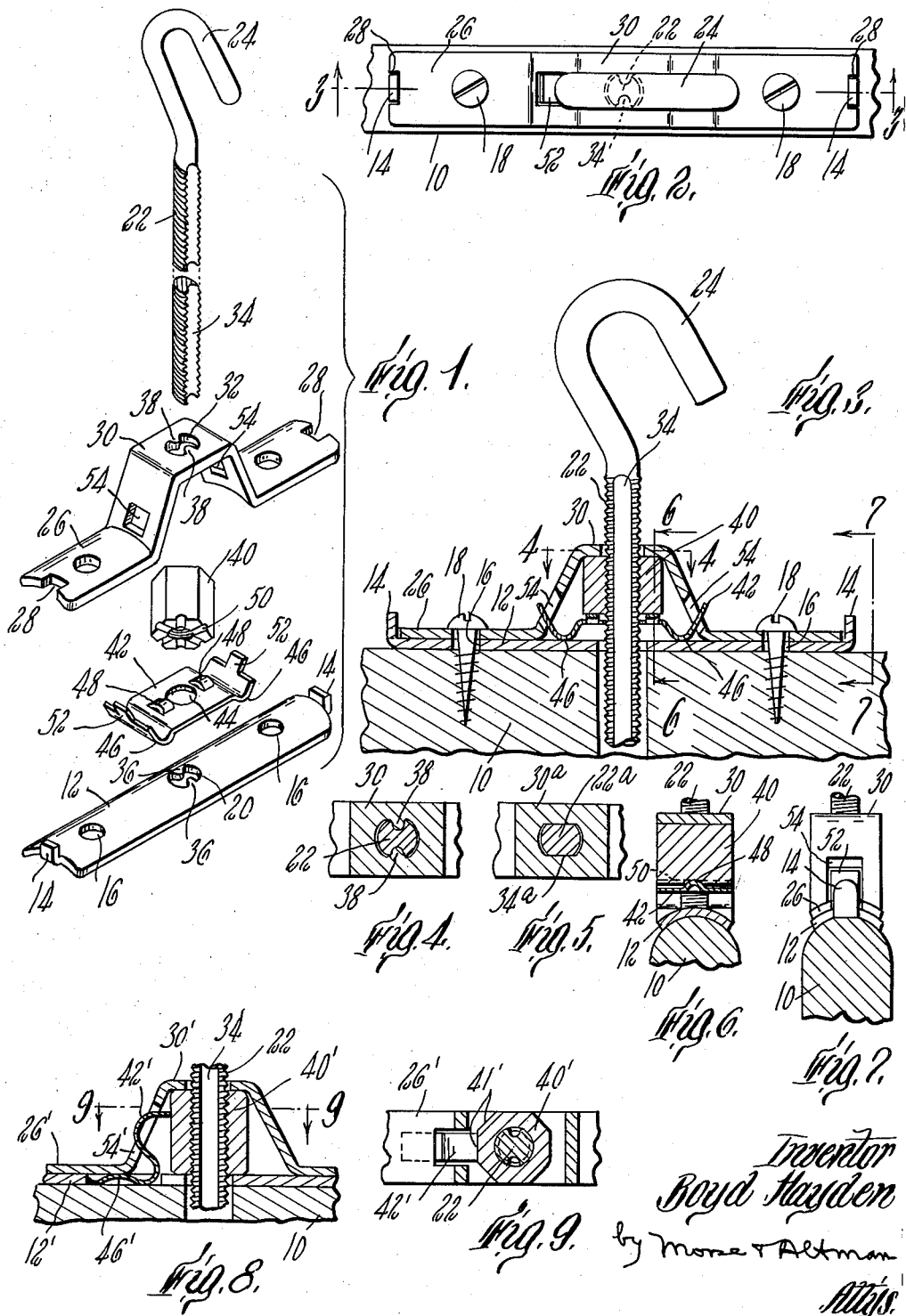

2,982,314

ADJUSTABLE HOOK FOR HARNESS FRAME

Boyd Hayden, Newtonville, Mass.
(452 Pleasant St., Watertown 72, Mass.)

Filed May 8, 1959, Ser. No. 811,901

1 Claim. (Cl. 139—88)

This invention relates to fittings such as hooks mounted on harness frames to connect such frames to the terminals of dobby cords in a loom. Such connections must be adjustable so that the frame may be properly supported with reference to other frames in the loom. Many adjustable hooks for this purpose have heretofore been made. It is an object of the present invention to provide a fitting which can quickly and easily be adjusted to vary its height, and which will retain its adjusted condition in spite of vibration and rapid reciprocating movements of the frame.

For a more complete understanding of the invention reference may be had to the following description thereof, and to the drawing, of which—

Figure 1 is an exploded perspective view of an embodiment of the invention;

Figure 2 is a plan view of the same;

Figure 3 is a section on the line 3—3 of Figure 2;

Figure 4 is a section on the line 4—4 of Figure 3;

Figure 5 is a section similar to Figure 4, but of a modified form;

Figure 6 is a section on the line 6—6 of Figure 3;

Figure 7 is a section on the line 7—7 of Figure 3;

Figure 8 is a section similar to a portion of Figure 3 but of a modified form; and Figure 9 is a section on the line 9—9 of Figure 8.

In Figure 3 a fragment of a loom harness frame 10 is shown, on which is mounted a hook and fitting embodying the invention. The fitting comprises a strip of metal 12 having ears 14 turned up at the ends thereof. As the top edge of harness frames is usually rounded, the strip 12 is also rounded so as to fit thereon. The strip is provided with two holes 16 to receive screws 18 by which the fitting is secured to the top edge of the frame 10. At the mid point of the strip 12 is a third hole 20 which receives the shank 22 of a hook 24 as hereinafter described.

Overlying the strip 12 is a top strip 26 which is notched at its ends as at 28 to receive the ears 14 of the strip 12 so as to locate the top strip 26 directly over the strip 12. A portion of the strip 26 is reversely bent so that the mid portion 30 is offset upward, leaving a substantial space between it and the mid portion of the strip 12. Directly above the hole 20 is a similarly shaped hole 32, both of these holes being shaped for a sliding fit by the shank 22 of the hook 24. It is important that the plane of the hook 24 be maintained in the plane of the harness frame itself so that the hook will not engage and injure adjacent harness frames as it would if it were permitted to turn about its axis. To prevent turning movement of the hook, the threaded shank 22 is preferably grooved as at 34, two such grooves on opposite sides of the shank being preferred. These grooves receive small projections 36 which extend out from the sides of the hole 20 in the strip 12 and similar projections 38 which extend out from the sides of the hole 32 in the offset portion 30 of the top strip 26. One such projection is sufficient to prevent rotative movement of the shank 22 within the holes 20 and 32, but the four projections 36, 38 shown in Figure 1 are preferred.

An alternative form of shank and corresponding holes in the strips is indicated in Figure 5, the shank 22a having two flaps 34a on its sides and being fitted slidably in a corresponding hole in the offset portion 30a of the top strip in corresponding hole (not shown) in the bottom strip.

Immediately below the offset portion 30 of the top strip a nut 40 is in threaded engagement with the shank 22 of the hook. Since the hook is held against rotation, rotation of the nut 40 will result in an upward or downward movement of the hook. According to the present invention, simple spring means are provided to hold the nut yieldingly against rotation. For this purpose a spring member 42 is mounted under the nut 40. The member 42 may consist of a strip of spring metal having a central hole 44 through which the shank 22 of the hook passes. The spring 42 has two reversely bent portions 46 which bear on the strip 12 to elevate the central portion of the spring 42 so that it presses resiliently against the bottom of the nut 40. Two bosses 48 are formed on the mid portion of the spring member 42 near the hole 44. These bosses engage in two of a series of recesses 50 in the bottom face of the nut 40. As shown in Figure 1, these recesses are radial grooves. If the nut is turned manually, the bosses 48 which are in two of the grooves 50 initially resist the turning movement but yield to permit it. As the nut is turned, the bosses 48 snap into successive grooves 50 so that when the nut has been adjusted, it is yieldingly held in its adjusted position and will maintain that position in spite of the vibration of the loom and the rapid movements of the harness frame during the operation of the loom. The nut, however, is always available for manual operation to adjust the hook upward or downward. The spring member 42 must be held against rotation. For this purpose terminal tongues 52 may extend through holes 54 in the upper strip 26.

A modified form of detent for the nut is illustrated in Figures 8 and 9. As therein shown, a fitting is mounted on the harness frame 10, this fitting comprising a lower strip 12' surmounted by an upper strip 26' with an upwardly offset portion 30', these strips having aligned holes as hereinbefore described to receive the shank 22 of the hook with a sliding fit. A nut 40' is inserted in engagement with the portion of the shank 22 immediately below the offset portion 30' of the top strip 26'. As indicated in Figure 9, this nut is prismatic in shape, having a number of plane faces 41'. The spring detent means in this form of the invention consists of a strip 42' of spring metal one end of which is resiliently pressed against a face 41' of the nut 40'. The other end portion 46' may be anchored in any convenient way. As shown, it is caught under a portion of the top strip 26', an aperture 54' being provided in the top strip to allow freedom of movement of the portion of the spring 42' which is adjacent to the end bearing against a face of the nut 40'. When the nut 40' is manually turned, the turning movement will be initially resisted by the spring pressure of the spring 22' against a face of the nut. The nut is thus held yieldingly against accidental change in the adjustment thereof but is available for quick and easy adjustment by an operator.

I claim:

A fitting for a loom harness frame, comprising a rigid strip adapted to be secured to the upper edge of said frame, the mid portion of said strip being offset upward from the end portions, said offset portion having a hole therethrough, a hook having an elongated threaded shank extending down through said hole and longitudinally movable therein, means preventing rotation of said shank relative to said strip, said means comprising a longitudinal groove in the threaded shank of said hook and a projection on the offset portion of said strip engaging slidably in said groove, a nut threaded on said shank immediately below said offset portion of the strip, and spring detent means bearing against said nut and distortable by rotative movement of said nut from any one of a series of angular positions, said detent means and strip having mutually engaging parts positively locking said detent means against rotation relative to said strip.

References Cited in the file of this patent

UNITED STATES PATENTS

| | | |
|---|---|---|
| 71,722 | Ellsworth | Dec. 3, 1867 |
| 1,406,423 | Smith | Feb. 14, 1922 |
| 1,664,744 | Hartkopf | Apr. 3, 1928 |
| 2,601,872 | Kaufmann | July 1, 1952 |
| 2,659,394 | Kaufmann | Nov. 17, 1953 |